United States Patent [19]
Halko et al.

[11] 3,845,531
[45] Nov. 5, 1974

[54] COMPOSITE CASTING APPARATUS

[75] Inventors: Andrew R. Halko, Newark; Allan B. Hughes, Wilmington, both of Del.

[73] Assignee: Halko Manufacturing Company, Inc., New Castle, Del.

[22] Filed: Oct. 23, 1973

[21] Appl. No.: 408,746

[52] U.S. Cl.................. 29/33 C, 164/269, 164/154
[51] Int. Cl...................... B22d 31/00, B22d 45/00
[58] Field of Search ...... 29/33 C; 164/112, 98, 332, 164/269, 334, 4, 154

[56] References Cited
UNITED STATES PATENTS

| | | | |
|---|---|---|---|
| 3,137,045 | 6/1964 | Sunday | 164/154 X |
| 3,191,246 | 6/1965 | Pouell | 164/269 X |

Primary Examiner—Gil Weidenfeld
Attorney, Agent, or Firm—Mortenson & Weigel

[57] ABSTRACT

A mold cavity is formed by movable dies actuated by an operating linkage. A casting metal is pumped into the mold by a pump injection assembly to form composite articles, such as wheel weights having a clip for rim attachment and the casting. A pivotable transfer mechanism has two angularly disposed pick-ups which operate in unison to first simultaneously pick-up a clip from a clip supply magazine and pick-up the molded composite article from the mold. The transfer mechanism is then pivoted through an arc to relocate the pick-up such that when the pick-ups again operate in unison, this time they introduce a new clip into the mold and simultaneously therewith pass the composite casting to a cut-off position at which the sprue is removed. The composite casting is then removed from the pick-up and passed down a chute to a storage bin. The transfer mechanism operation and the molding operation is controlled by logic which senses a prior condition to determine the completion of each prior operation before proceeding to the next step of the process without regard to the time element.

23 Claims, 17 Drawing Figures

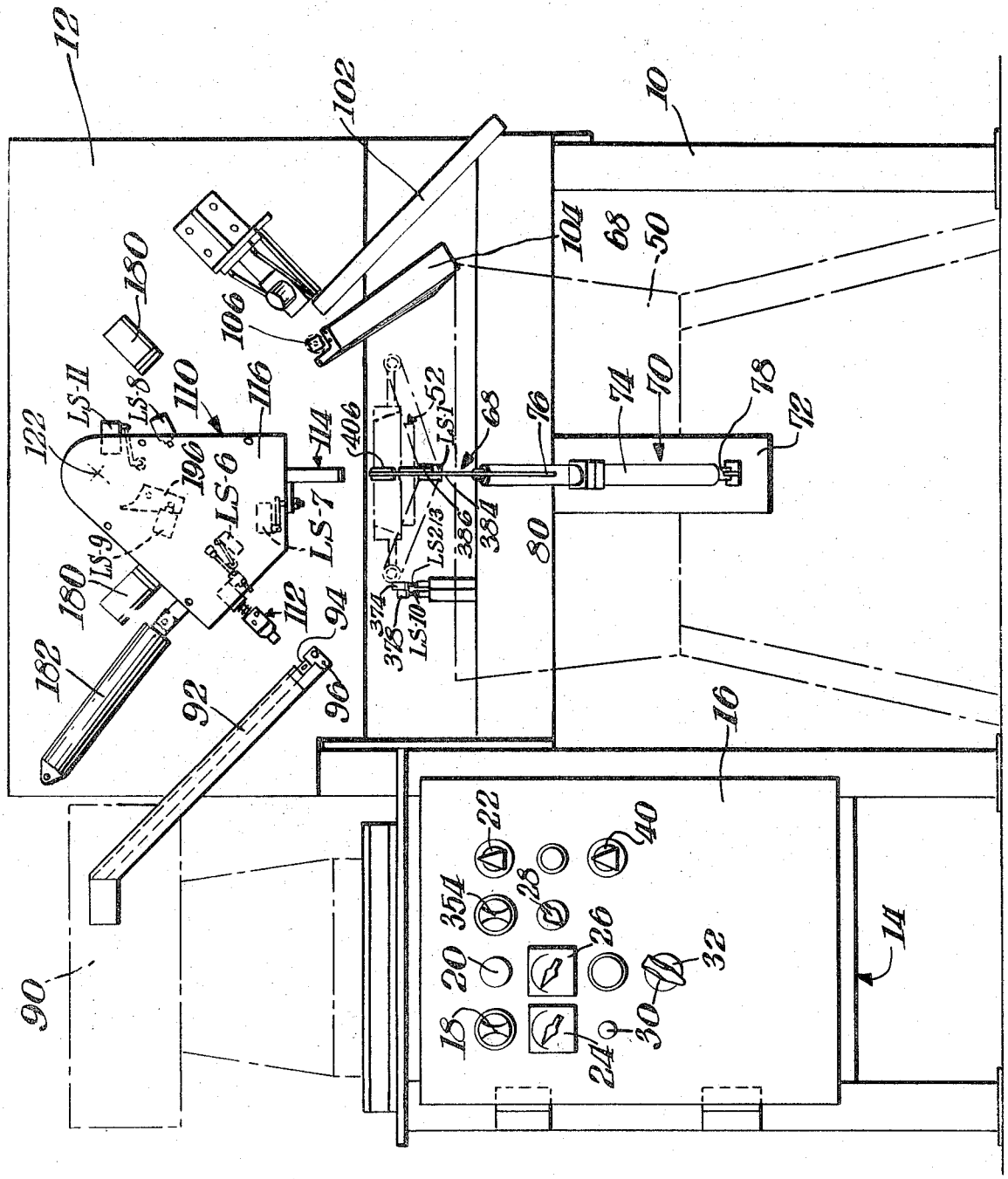

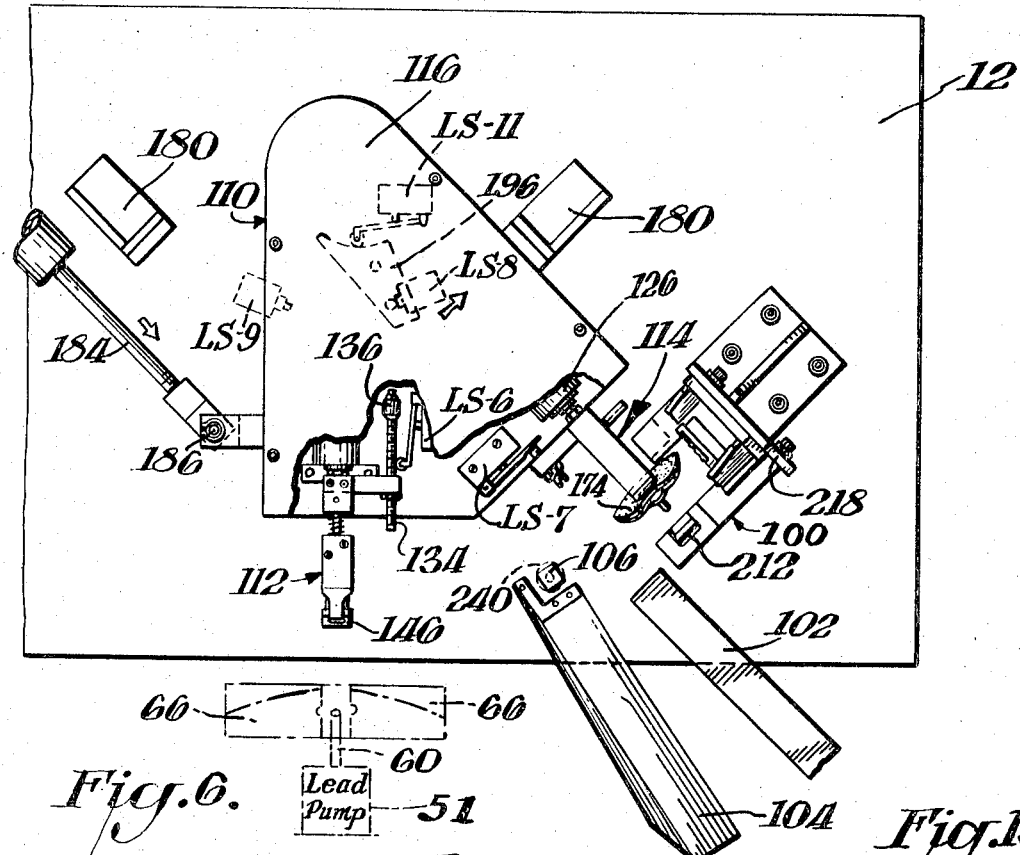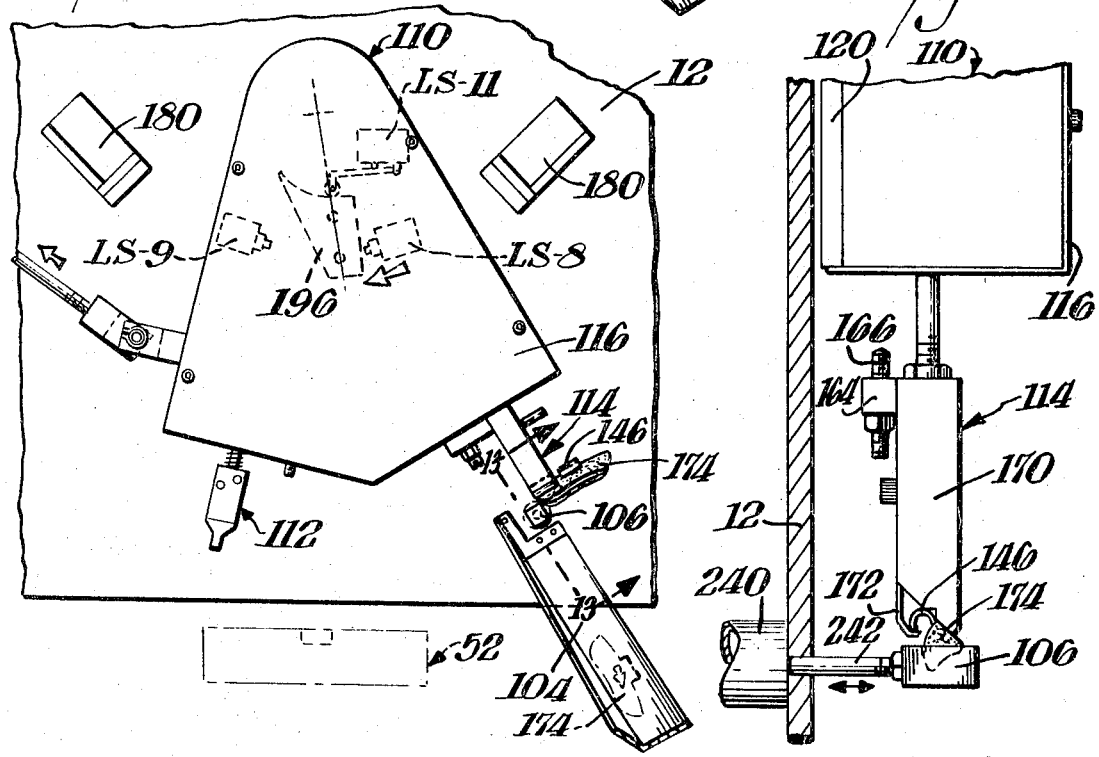

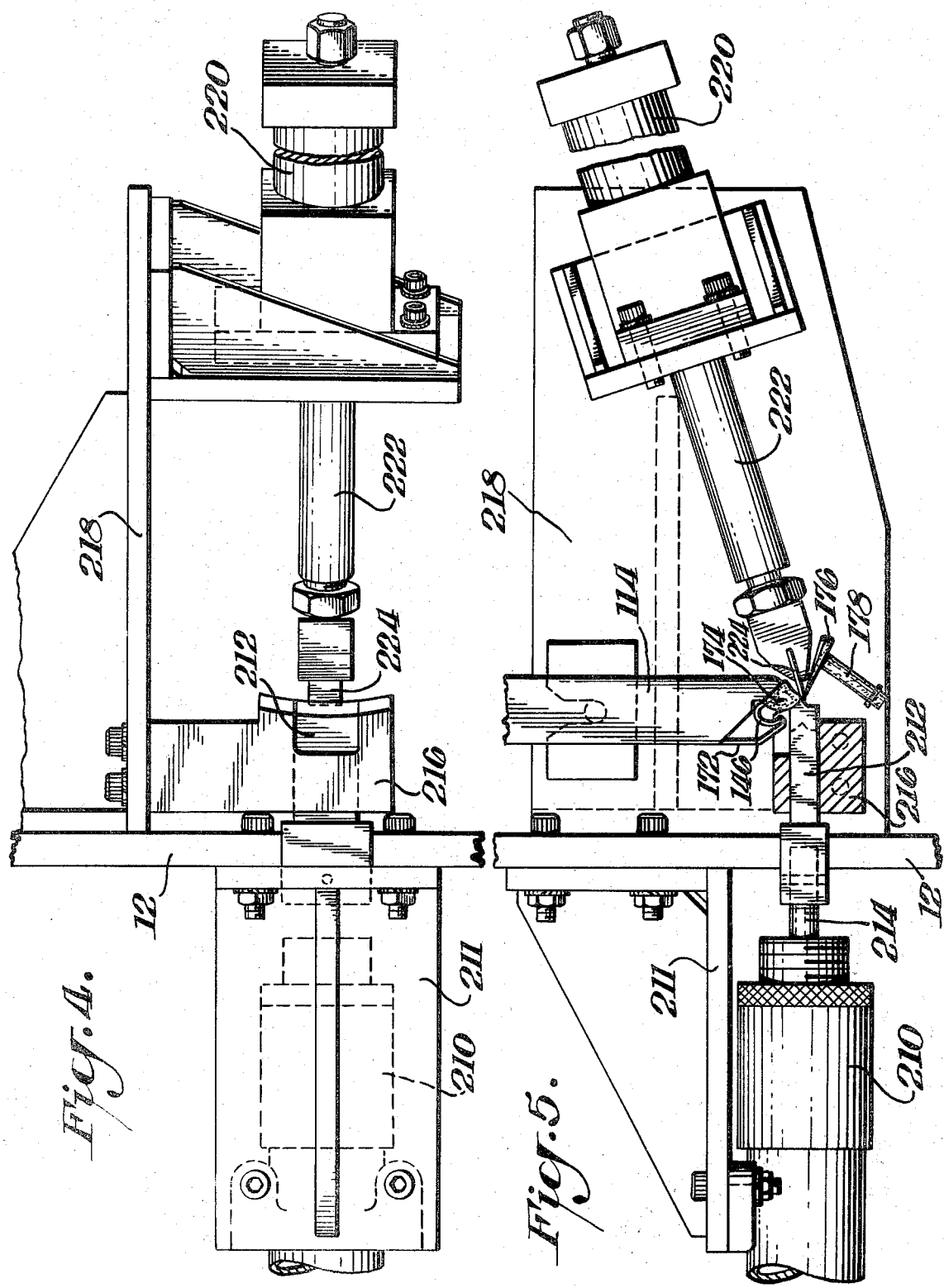

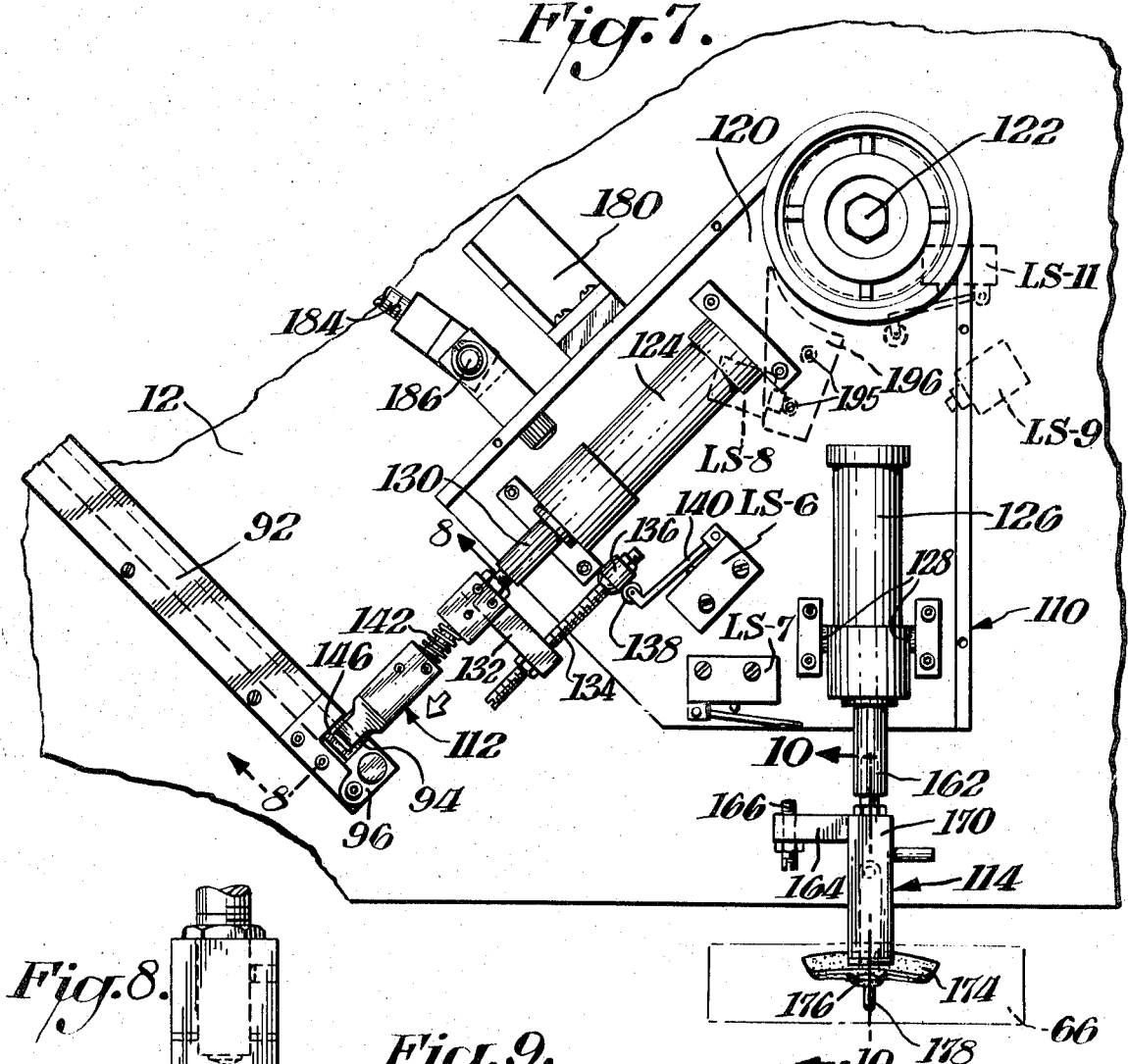

COMPOSITE CASTING APPARATUS

BACKGROUND OF THE INVENTION

This invention relates to die casting apparatus and, more particularly, to an automatic apparatus capable of making composite die castings.

There are a number of machines on the market today which are capable of effecting automatic molding. Among such machines are those capable of automatically pumping a casting metal such as lead from a pot using an injection pump into a die casting mold cavity. At this point the item such as a clip, about which the casing is to be formed, is introduced into the mold and the casing metal injected to form the casting. Often these machines operate on a strict timed cycle such that if any step in the sequence is delayed, the entire operation malfunctions or is switched off as a safety precaution. This causes unnecessary delays. While many of these prior art machines are quite effective, they also tend to be relatively expensive.

It is, therefore, an object of this invention to provide an improved low cost automatic mechanism for effecting composite die castings.

Another object of this invention is to provide an improved automatic mechanism for effecting composite die castings which operates in a sequential manner sensing the completion of each prior operation before preceeding to the next step.

A further object of this invention is to provide an improved die casting apparatus which effects the removal of the sprue from the casting at a location remote from the mold.

Another object of this invention is to obviate many of the disadvantages of the prior art automatic die casting machines.

BRIEF DESCRIPTION OF THE INVENTION

According to one embodiment, this invention is used with an apparatus for effecting composite die castings which includes a mold having cooperating die members, actuating means for operating the members between open and closed mold positions, a container for molten metal communicating with the mold to form composite castings including a sprue, pump means for transferring the molten metal into the mold, and a supply magazine for continuously supplying parts to a delivery position. The invention incorporates cutting means for separating the sprue from the die casting and a pivotal transfer means for sequentially transferring the parts from the supply magazine to the mold for incorporation in a composite casting and for transferring the casting from the mold to the cutting means.

In a preferred embodiment of the invention, the transfer means includes a pair of angularly displaced pick-ups adapted to simultaneously engage the parts in the supply magazine and the mold when in a first pivotal position and the mold and the cutting means when in a second pivotal position. Each of the pick-ups are mounted on separate clip and weight actuating means which are axially extendable for said clip pick-up to withdraw a part from the magazine, and insert the part into the mold and for said weight pick-up to withdraw the casting from the mold and introduce the casting to the cutting means. Further, a knock-off means removes the castings from the weight pick-up means upon subsequent movement of the transfer means.

In a particularly preferred embodiment, the cutting means includes a cooperating movable anvil and cutting hammer for removal of the sprue from the die casting. Logic elements control the sequence of operations and sense the completion of each prior step before initiating a subsequent step, without regard to a particular time sequence.

BRIEF DESCRIPTION OF THE DRAWINGS

The novel features that are considered characteristic of this invention are set forth with particularity in the appended claims. The invention, itself, however, both as to its organization and method, as well as additional objects and advantages thereof, will best be understood from the following description when read in connection with the accompanying drawings, in which:

FIG. 1 is a front elevation view of an automatic die casting machine constructed in accordance with this invention;

FIG. 3 is a front elevation view, partially cut-away of the transfer mechanism of this invention in a counter-clockwise position with the pick-ups retracted;

FIG. 4 is a front elevation view of the sprue cutting mechanism partially cut away;

FIG. 5 is a side elevation view, with a portion cut away, of the sprue cutting mechanism illustrated in FIG. 4;

FIG. 6 is a front elevation view of the transfer mechanism with the pick-ups extended during operation in the process of being moved in a clockwise sense to effect removal of the cast item from the pick-up mechanism;

FIG. 7 is a front elevation view of the transfer mechanism with the cover plate removed depicting the pick-up cylinders and associated mechanism with the pick-ups extended, the transfer mechanism in a clockwise position;

FIG. 8 is a fragmented view of the pick-up fingers used to pick-up the items to be incorporated in the casting taken through the section 8—8;

FIG. 9 is a fragmental front elevation view of the finger mechanism illustrated in FIG. 8;

FIG. 10 is a fragmented cross-sectional view of the weight pick-up mechanism taken through the section line 10—10;

FIG. 13 is a fragmental side elevation view of the weight pick-up mechanism cooperating with the knock-off bar to effect removal of the casting from the weight pick-up;

DETAILED DESCRIPTION OF THE INVENTION

Figure 2A:
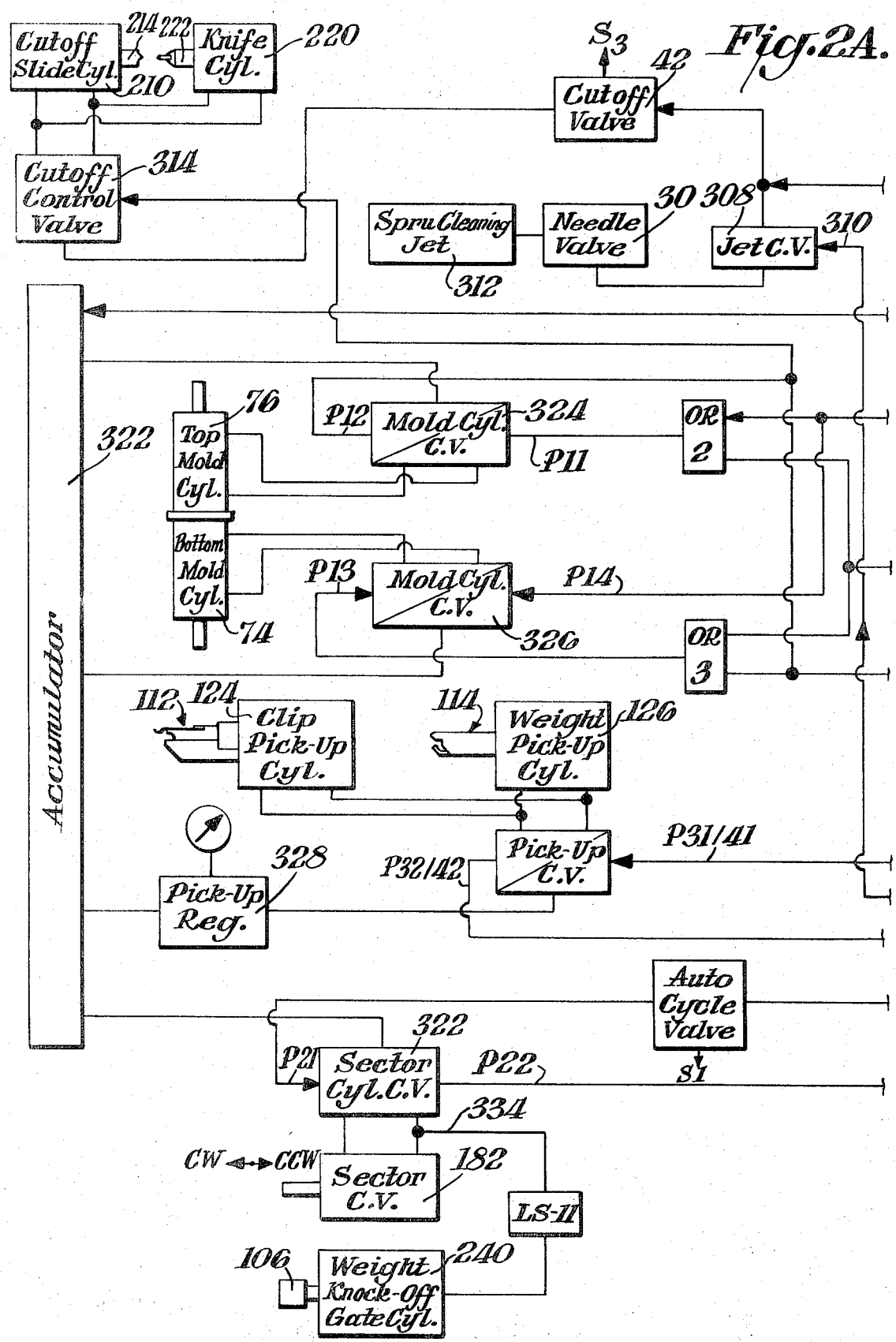
FIGS. 2A and 2B are block schematic diagrams of the pneumatic logic that is employed to control the sequencing of the automatic machine illustrated in FIG. 1.
Figure 2B:
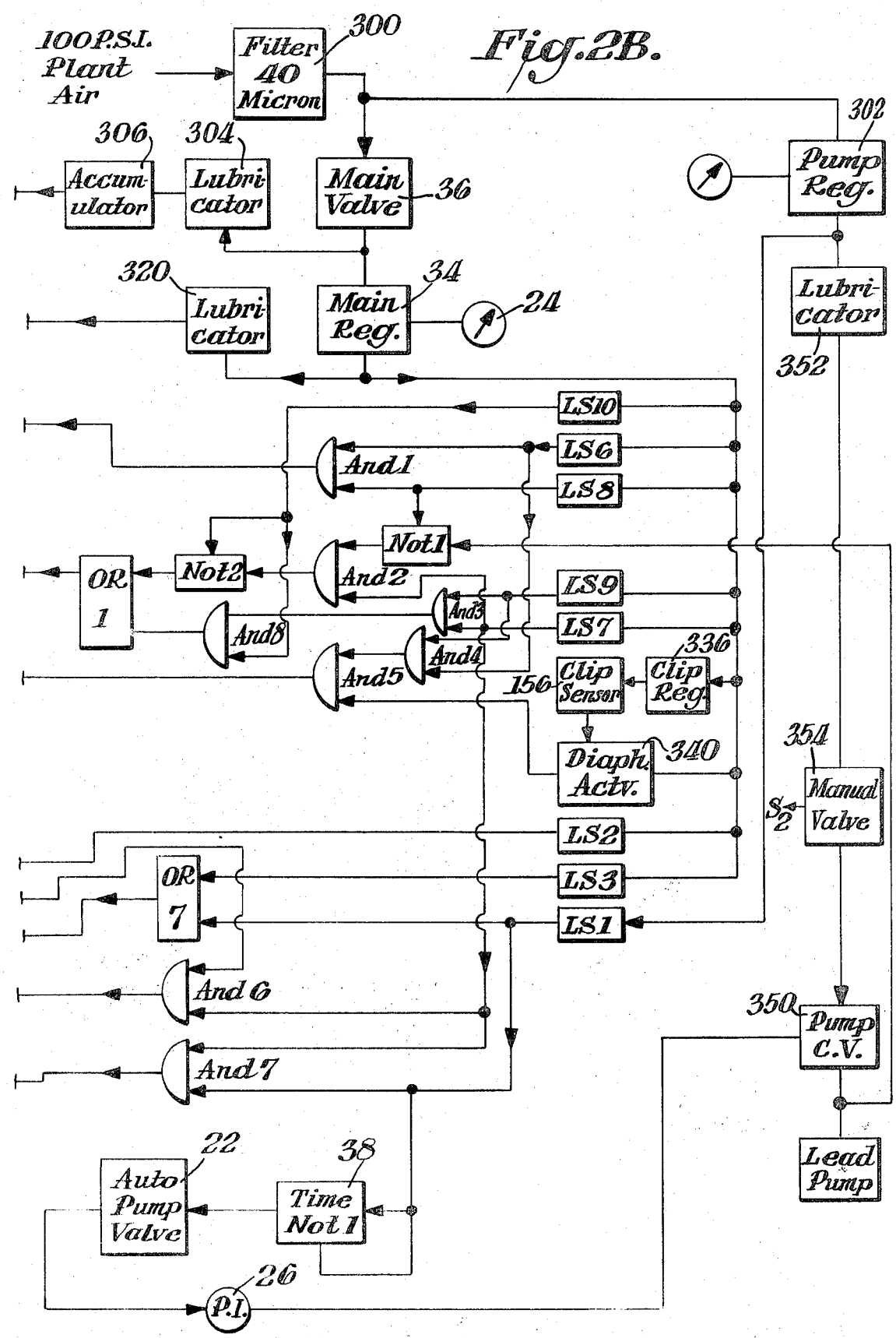

The automatic apparatus of this invention is seen most clearly with reference to the drawing and particularly to FIGS. 1 and 7. This apparatus is seen to include a main frame 10 having a mounting plate 12 secured thereto. Also mounted on the main frame 10 is a control cabinet 14 having a door 16 on which are mounted a number of the control elements of the automatic apparatus. These control elements include a feeder switch 18, an air on-off switch 20, an automatic pump valve 22, a pair of pressure gauges 24 and 26, a knob 28 for effecting control of the time delay for initiating pumping of the molten metal as will be described hereinafter, a needle valve 30, a pressure regulating knob 32 for controlling the pressure in the system, a knob for operating a lead flow valve 354 (FIG. 2B) and a knob 40 for controlling a cutoff valve 42 (FIG. 2A). The knob 32 is connected to control the main regulator 34 (FIGS. 2A and 2B). The main valve 36 (FIG. 2B) for the system is controlled by the air on-off switch 20. The time delay knob 28 controls a time NOT circuit 38 (FIG. 2B).

Figure 14:
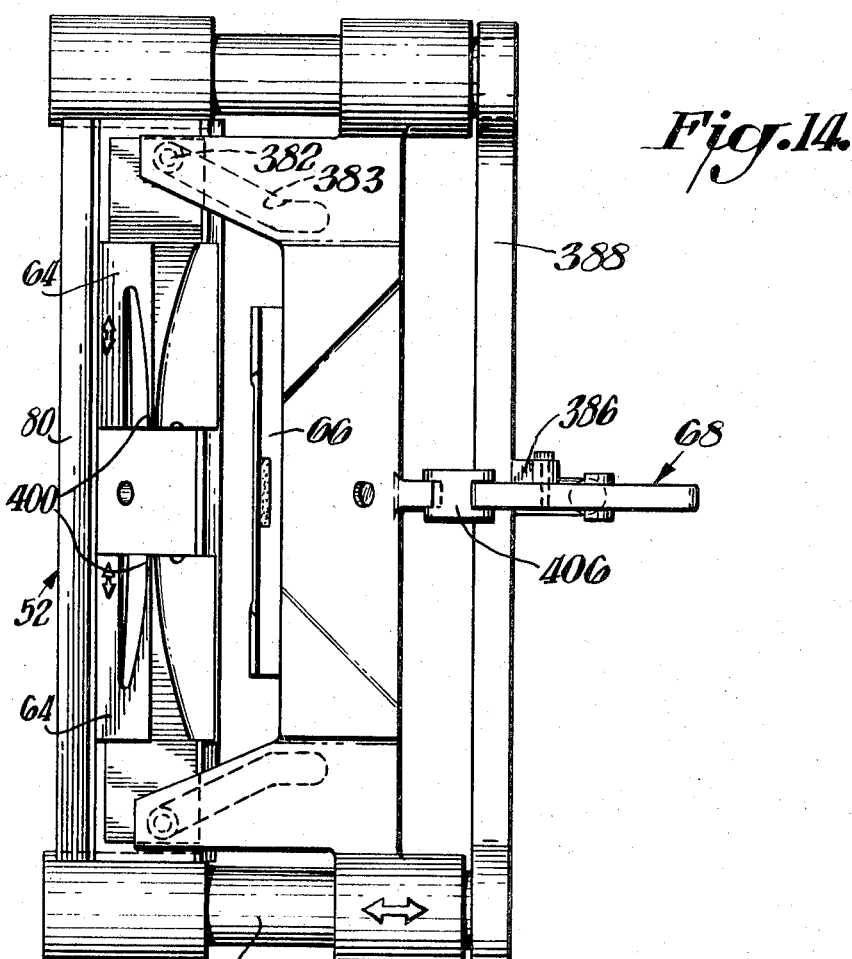
FIG. 14 is a plan view of the mold that may be used with this invention.
Figure 15:
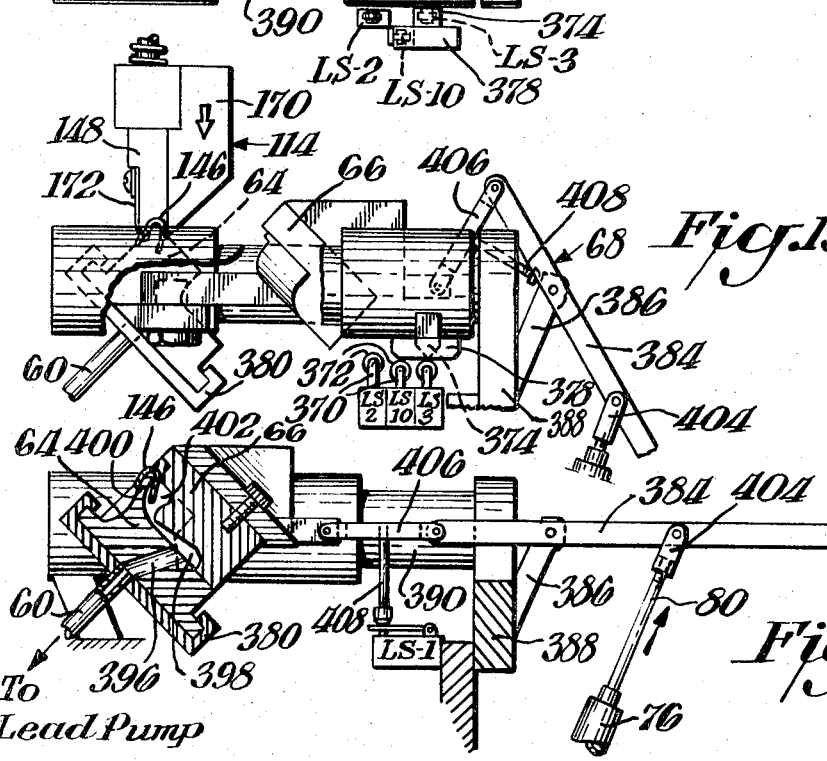
FIG. 15 is a side elevation view of the mold illustrated in FIG. 14 with apportion partially cut away to illustrate the sliding dies.
Figure 16:
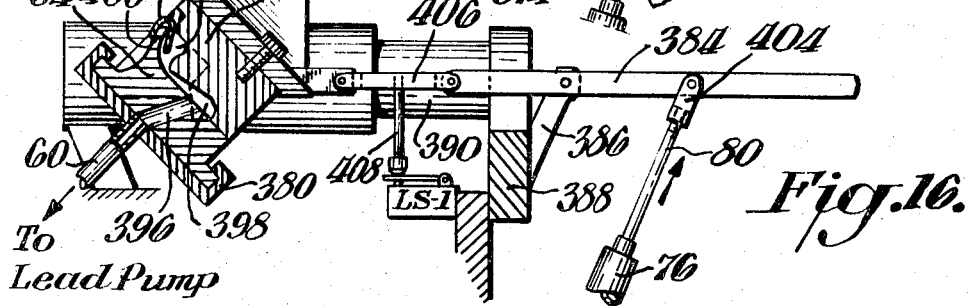
FIG. 16 is a side cross-sectional view of the mold illustrated in FIG. 14.

Positioned immediately behind the frame 10 is a pot 50 which is heated by a suitable flame (not shown) in which the molten metal, such as lead, to be used in the casting is held. A pump injection assembly or lead pump 51 (FIG. 6) in the described application is disposed in the pot 50 and adapted to pump the molten metal from the pot into a mold 52 (FIGS. 14–16), which in most drawings is illustrated only schematically for sake of simplicity. The mold 52 as is the injection pump, may be of any conventional design. Preferably, the mold, however, must be of a die type having movable dies which open and close to define the mold cavity. The rear guide 380 of the mold is fixed in position and is connected by a suitable tubing 60 to the injection pump 51. The molten metal flows through this tubing 60 which as it joins the sprue cavity 398 passes through a restricted orifice (not shown) to permit the sprue to be broken off at this point when the casting is removed as will be described hereinafter.

The left and right dies 64 of the mold 52 are operated by a locking linkage 68 which is operated by a die closing mechanism 70. The die closing mechanism 70 is bolted to a plate 72 which is a part of the frame 10 and includes two aligned mold cylinders, a bottom mold cylinder 74 and a top mold cylinder 76. The actuating piston 78 of the bottom mold cylinder 74 is pivotally connected to the lower portion of the plate 72 whereas the actuating piston 80 of the op mold cylinder 76 is pivotally secured to drive the locking linkage 68 of the mold 52 by actuation of the mold cylinders 74 and 76. The die may be fully opened, fully closed, or by actuation of only one cylinder, opened to a mid-position during which a clip or other item which is to be molded to form the composite cast article may be introduced into the top portion of the mold.

In this particular illustration, the apparatus is described in conjunction with a wheel weight molding machine. These clips 146 which are used to attach the wheel weights to the rim of a tire are generally U-shaped in cross-section. They are derived from a vibratory feeder 90, which is illustrated in phantom since it does not form a part of this invention and is of conventional design. The clips 146 are fed down through a supply magazine or clip track 92 where the clips move by gravity down to a pick-up point 94. At this point the supply magazine 92 is open to permit a pick-up to grasp an individual clip and place it into the mold as will be described. The supply magazine has a clip retaining member 96 at the lower portion thereof which may be pivoted out of position and changed to accommodate clips of different sizes for different size weights. After molding, the composite articles or wheel weights are transferred from the molds 52 over to a sprue cut-off mechanism 100 which is seen more clearly in FIGS. 4 and 5 and will be described hereinafter. Associated with the sprue cut-off mechanism 100 is a scrap chute 102 which directs the cut-off sprue into a scrap box or other container. Immediately below and to the left (in the drawing) of the sprue cut-off mechanism 100 is a weight chute which directs the completed wheel weight into a bin. This weight chute 104 is located directly below a knock-off bar 106 which removes the wheel weight from the weight pick-up mechanism of the machine and causes it to drop into the weight chute.

A pivotable transfer mechanism or sector 110 is pivotally mounted to the plate 12 and is adapted to pivot in a plane parallel to that of the plate and to sequentially position a clip pick-up mechanism 112 from between the pick-up point 94 and the mold 52 and simultaneously position a weight pick-up mechanism 114 between the mold and the sprue cut-off mechanism 100. It is thus apparent that the clip pick-up mechanism 112 affects the transfer of a clip from the pick-up 94 to the mold 52, and simultaneously therewith, the weight pick-up mechanism 114 effects the transfer of a molded composite article or wheel weight in this case from the mold 52 to the sprue cut-off mechanism 100.

Figures 11, 12:
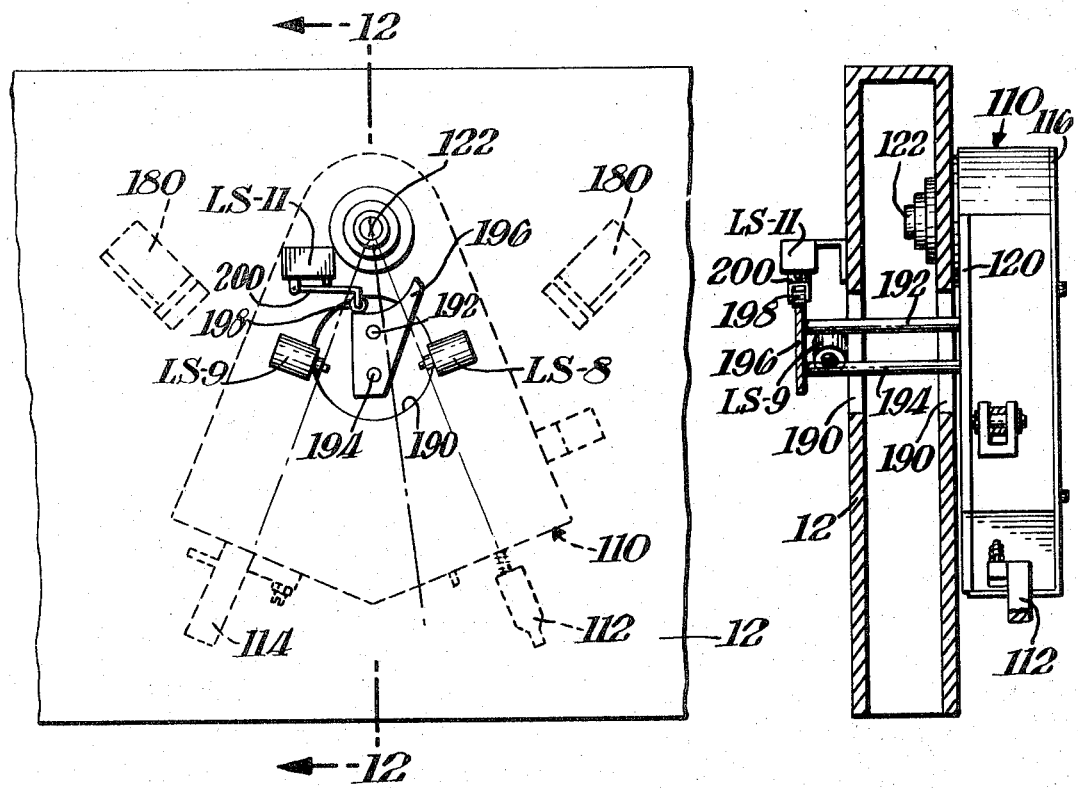
FIG. 11 is a partial back elevation view of the rear side of the mounting plate for the transfer mechanism depicting the limit switches and cams used to sense the position of the transfer mechanism.
FIG. 12 is a side elevation view of the sector mechanism illustrated in FIG. 11.

The sector 110 has a front cover 116. The interior of the sector 110 is seen most clearly in FIG. 7. In this figure the sector is seen to include a back plate 120 which is pivotally mounted as by the rod 122 to the plate 12 (FIG. 12).

The clip pick-up mechanism 112 includes a clip pick-up cylinder 124 which is bolted to the back plate 120 and is aligned along the lefthand side of the sector 110 so as to be angularly displaced from the weight pick-up mechanism 114 which in turn includes a weight pick-up cylinder 126 which is pivotally mounted as by pivots 128 to the back plate 120 to pivot in a plane generally perpendicular to the back plate 120. The clip pick-up mechanism 112 includes a non-rotatable piston rod associated with the pick-up cylinder 124 which may be a conventional air cylinder operable in either direction by the introduction of pressurized air thereinto. These cylinders may be of any suitable conventional type. Attached to the piston rod 130 is a mounting bracket 132 to which is secured a cam rod 134. A cam 136 is mounted on the upper end of the cam rod 134 and is adapted to operate a cam follower 138 secured to a switch arm 140 of a limit switch LS6. The limit switch LS6 is a conventional air control gate or switch which functions to control the flow of air therethrough. When the switch arm 140 is pressed against the limit switch itself, the air passages are open; conversely, when the switch arm is away from the body of the switch, the air passages are closed. These limit switches are of conventional design. The air connections to the limit switches are not shown but their interconnections are depicted in the logic diagram and will be described in conjunction with FIGS. 2A and B.

Also secured to the piston rod 130 is a spacer spring 142. Secured to the end of the piston rod 130 is the finger assembly for picking up the clips which includes a first fixed finger 144 that is adapted to engage the back side of the clips 146, a second fixed finger 148 which engages a portion of the front or free side of each clip 146 and finally a spring finger 150 which is secured to the second fixed finger 148. The end portion of the spring finger 150 is bent inwardly so as to enable it to snap over, grasp and retain the clip 146. These clips 146 slide down a knife edge 152 of the clip magazine, the end of view of which is seen in FIG. 8. A cavity 154 is formed within the second fixed finger 148 so as to accommodate clip sensor 156 which is merely in the form of a cavity having air passages 158 connected thereto and connected into a sensing diaphragm which will be described in connection with the logic diagram of FIG. 2B. A bore 160 is formed axially in the second fixed finger 148 to permit air from the clip sensor 156 to pass against the clip. When the passage of this air is blocked by the clip, as will be described, the presence of the clip is sensed.

The weight pick-up cylinder 126 also has a nonrotatable piston rod 162. A bracket arm 164, in which is mounted an adjusting cam screw 166, is secured to the piston rod 162 by any suitable means. This adjustable cam screw 166 is adapted to operate the switch arm 168 of a limit switch LS7 which is secured to the back plate 120. The upward movement of the piston rod causes the adjustable cam screw 166 to close the switch arm 168. Hence, the rectraction of the weight pick-up mechanism 114 is sensed. In similar manner, the limit switch LS6 is closed when the clip pick-up is extended.

Pick-up fingers for the weights or castings are secured to the end of the piston rod 162 of the weight pick-up mechanism 114. Their construction is seen most clearly in FIG. 10. The weight pick-up mechanism includes a fixed finger 170 and a flexible finger 172, the extreme end portion of which is bent inwardly so as to permit it to snap over and grasp the clip 146 from the mold after it is formed into a composite casting, the wheel weight in this illustration, which includes the clip 146 and the lead weight casting. The composite article is designated 174. The composite article or casting 174 includes not only the weight and clip, but also the to be discarded sprue 176 and the riser 178 which is formed by the passageway 396 (FIG. 16) through which the lead enters the mold from the pump injection mechanism. The fingers of the weight mechanism 114 are of sufficient strength to grip the clip 146 and in removing the weight from the mold, the sprue 176 is broken off at the riser at the restricted point in the passage as described previously.

The sector 110 has its angular movement in either direction limited by stops 180 which are mounted to the plate 12. The actuate motion of the sector is achieved by a sector actuating cylinder 182 which is pivotally mounted to the plate 12 at the rear end, its piston rod 184 being pivotally secured to the back plate 120 of the sector as by the pivot 186.

The position of the sector 110 is sensed by three limit switches LS8, LS9 and LS11, each of which is secured to the rear side of the plate 12 which can actually be seen most clearly in FIG. 12 as preferably being a hollow rectangular box at least in the center portion so formed to provide additional strength. Slots 190 are formed in the plate 12 to permit the arcuate movement therethrough of cam rods 192 and 194. These cam rods are secured to the back plate 120 of the sector as seen at 195 (FIG. 7). Returning to the illustrations of FIGS. 11 and 12, these cam rods 192 and 194 are seen to mount an arcuate cam 196 whose arcuate length corresponds to the position of the sector when in a full counterclockwise and continues over to a point approximately 30° from the extreme clockwise position of the sector. This cam 196 is adapted to engage a cam follower 198 which actuates the cam arm 200 of the limit switch LS11 which is secured to the back plate 12. Two other limit switches LS8 and LS9 are positioned to sense the extreme clockwise and counterclockwise positions respectively of the sector. Thus, the limit switch LS8 is adapted to be actuated by the cam rod 194 when the sector is in an extreme clockwise position and in like manner the limit switch LS9 is positioned to be actuated or opened by the cam rod 194 when the sector is in the extreme counterclockwise position.

The sprue cut-off mechanism is seen most clearly in FIGS. 4 and 5. Thus, the casting 174 which includes the clip 146 as an integral part thereof, is transferred as will be described, from the mold 52 by the weight pick-up mechanism 114 over to the sprue cut-off mechanism 100. The sprue cut-off mechanism 100 includes an anvil cylinder 210 which is bolted to a bracket 211 secured to the plate 12 such that the cylinder is positioned perpendicular to the plate 12. The piston rod 214 of the anvil cylinder 210 has a rectangular anvil member which is adapted to move forwardly through the plate 12 up to the position of the casting 174 and provide a support therefor. The end of the anvil 212 is shaped to conform to the shape of a typical casting 174 (in this instance a wheel weight is illustrated). The anvil 212 is adapted to move through a guide slot formed in a guide member 216 which is bolted to a bracket 218 attached to the front side of the plate 12.

Also mounted on the bracket 218 is a cutting hammer cylinder 220 which has a non-rotatable piston rod 222. A cutting knife 224 is attached to the end of the piston rod 222 such that the knife 224 is adapted to cooperate with the anvil 212 to separate the sprue 176 from the casing 174. The sequence of operation is such that the casting is moved into position, then the anvil 212, having a shorter distance to travel, is moved up in a support position following which the cutting knife 224 effects its cutting action against the anvil 212.

Immediately below and to the left of the sprue cutoff mechanism 100 there is positioned a knock-off bar 106, the details of which are seen most clearly in FIG. 13. The knock-off bar is adapted to be actuated by a knock-off cylinder 240, the front portion of which is mounted to the plate 12. The piston rod 242 of the knock-off cylinder 240 has a knock-off bar 106 secured to the end portion thereof such that when the piston rod extends, it interdicts the path of return movement of the casing 174 as the sector moves in a clockwise direction such that the casting 174 is knocked from between the finger of the weight pick-up mechanism 114 and allowed to drop into the weight chute 104 (FIG. 1).

Three additional limit switches are employed to sense the position of the mold 52. These limit switches LS2, LS3 and LS 10 each are adapted to cooperate with the locking linkage 68 to achieve this sensing. Thus, the limit switch LS2 senses the mid-position of the mold and is located to the left side (in the drawing) of the mold and slightly to the rear thereof. The limit switch LS3 senses when the mold is open and is positioned to the left front of the mold. Finally, the limit switch LS10 senses when the mold is anywhere from one-third open to full open and is positioned at the left middle portion of the mold. The limit switches each have actuating arms 370 and positioned on the extreme end thereof are cam followers 372. The cam followers for the limit switches LS2 and LS3 are adapted to be actuated by a cam surface 374 which is attached to the outer portion of a guide member 376 forming a part of the left side of the front mold die 66. Displaced slightly more remote from the guide member 376 is a second cam member 278 which is adapted to operate the limit switch LS10.

The mold itself includes, in addition to the front die 66, right and left dies 64 which cooperate with each other sliding toward and away from each other within a rear guide member 380. The outer portion of the right and left die members 64 have actuating pins 382 which are adapted to engage operating slots 383 formed in the front die member 66 such that as the front die member is moved toward the rear guide member these slots acting on the operating pins 382 move the right and left die members 64 toward each other. Conversely, as the front die 66 is moved away from the rear guide member, so as to open the mold, the right and left dies 64 are drawn apart. The front die is actuated by a locking linkage 68 which is in the form of a lever 384 pivoted to one end of a support arm 386, which acts as the fulcrum. The other end is attached to the front brace 388 of the die assembly. The guide member 376 slides on a guide rod 390 which is connected between the front brace 388 and the rear guide member 380. Both sides of the mold are generally symmetrically formed.

Lead is fed to the mold through the conduit 60 thence through a short passageway 396 (FIG.16) formed in the mating faces of the left and right dies 64. This passageway 396 communicates with the sprue cavity 398 which connects with the mold cavity 402.

The right and left dies 64 have formed thereon a ridge 400 which facilitates the mounting of the clip 146 thereon by the weight pick-up mechanism 114. Thus, the clip 146, as may be seen most clearly in FIG. 16, has one side extending into the mold cavity 402. The casting is formed about the clip to form the composite article comprising the clip and casting.

To complete the description of the actuating mechanism 68, the lower end of the lever arm 384 is connected by a clevis 404 to the end of the piston 80. The upper end of the lever 384 is pivoted on an operating arm 406 which is pivotally linked to the front die 66. A cam arm 408 is secured to the operating arm 406 and is adapted to engage the switch arm of the limit switch LS1 such that when the mold is closed the limit switch will be open to transmit its pneumatic logic signal. Thus, the mold is seen in its open position in FIGS. 14 and 15 and in its closed position with the piston 80 extended and locked in FIG. 16.

After a casting is made and the mold opened, the weight pick-up 114 merely grasps the clip from the mold and lifts. The lifting action causes the riser portion 178 (FIG. 5) of the casting to break at approximately the point between the passageway 396 and the conduit 60. It is at this point that it is often desirable to place a small restriction (not shown) in the conduit 60 to facilitate this breaking as was previously disclosed.

With reference now to the drawings of FIGS. 2A, 2B and 3, the pneumatic logic circuitry which controls the operation of the automatic mold mechanism will be described. The logic control circuit illustrated in FIGS. 2A and 2B, as noted above, controls the sequencing of the operation of the automatic composite die casting apparatus. This logic control system is based essentially on binary logic using pneumatic logic circuit elements. The binary "1," "0" functions are defined by the presence or absence of air pressure, respectively. The circuit functions included therein include those of the normal binary logic functions. That is, for example, an OR circuit that has two or more inputs and a single output. The output is "ON" representing a binary 1, i.e., by an air pressure signal, if any one or more of the inputs are "ON", i.e., a binary 1. The output is "OFF" only if all of the inputs are "OFF." The binary AND circuit has two or more inputs and a single output with the output being "ON" only if all inputs are "ON." Conversely, the output is " OFF" if one or more of the inputs are "OFF." Similarly, the binary NOT circuit has one input and one output with the output being "ON" if the input is "OFF" and vice versa. Thus, when the circuit output is "ON" pressurized air is allowed to pass through the NOT circuit.

The logic circuit includes an air compressor which in this case is designated as pressurized plant air which is filtered through a filter circuit 300 and thence passed to the main valve 36 controlled from the front panel and to a conventional air pressure pump regulator 302 which may have a pressure indicator if desired. From the main valve 36 the air is connected through suitable conduits to a lubricator 304 and an accumulator 306. The accumulator circuit 306 has the function of providing volume storage thereby reducing surges in the line. The output of the accumulator 306 is connected to a jet control valve 308 which may be a conventional automatic control valve which is controlled, i.e., opened, by the presence of a binary 1 or pressure signal on its input 310. This input is derived from the limit switch LS3 which is opened to pass air pressure when the mold is opened as previously described. The output of the control valve passes through a needle valve 30 thence to a sprue jet 312 located in the mold and functions to aid in clearing the mold of any particles or other unwanted debris. The sprue jet is not shown in FIGS. 14–16 for clarity of illustration.

The output of the accumulator 306 is also connected by a suitable air conduit to a cut-off valve 42 which in the logic discussion to follow is designated being open by the binary symbol $S_3$. The output of the cut-off valve 42 is coupled through a conduit to the input of a cut-off control valve 314 whose outputs are connected to the anvil or cut-off slide cylinder 210 and the cutting hammer or knife cylinder 222. (FIGS. 4 and 5) Both of these cylinder are spring loaded such that when actuated by the air pressure from the cut-off valve 314 their piston rods 214 and 222, respectively, extend and upon the release of air pressure, automatically retract. The cut-off valve 314 is controlled by an air pressure signal derived from the logic circuit as will be described hereinafter.

Air pressure from the main regulator 34 passes through a conduit to another lubricator circuit 320 thence through an accumulator 322, which acting against surges, supplies operating air pressure to a control valve 324 for the top mold cylinder 76, to a control valve 326 for the bottom mold cylinder 74 and through a pick-up pressure regulator 328 to a control valve 330 for the clip pick-up cylinder 124 and the weight pick-up cylinder 126. Finally, the accumulator also provides air pressure to the control valve 332 for the sector cylinder 182. Each of the top mold cylinder 76, bottom mold cylinder 74, weight pick-up cylinder 126, clip pick-up cylinder 124 and sector cylinder 182 have pneumatic control inputs connected to either end of the cylinder, as depicted in the drawing, such that their respective pistons operate in either direction, i.e., to extend or retract according to the air pressure applied by the respective control valves. The sector cylinder control valve 332 has its one output 334 connected to actuate the sector cylinder 182 to drive the sector in a clockwise direction. The output 334 is also connected through a limit switch LS11 which is opened when the sector is moving from its extreme counter clockwise position until it reaches a point two-thirds of the way towards its extreme clockwise position. The output of this limit switch is connected to the weight knock-off cylinder 240 (FIG. 13) which, when actuated, causes the knock-off bar 106 to extend as described. The cylinder is spring loaded to retract when the pressure signal is removed.

The main regulator 34 is connected to each of the limit switches LS1, LS2, LS3, LS6, LS7, LS8, LS9 and LS10. In addition, it is connected through a clip sensor pressure regulator 336 to the clip sensor 156 located in the second fixed finger 148 of the clip fingers as described previously. The output conduit from the clip sensor 156 is then passed to a diaphragm actuator 340 which controls the passage of air pressure from the main regulator through the actuator 340 to one input of two input AND gate, AND–5. The second input to the gate AND–5 is derived from the output of a fourth AND gate, AND–4, which has two inputs, one from the output of the limit switch LS–6 and the second from the output of the limit switch LS9. The output of the fifth AND gate, AND–5, is coupled through input of a third OR circuit OR–3 to the input designated P–13 of the bottom mold cylinder control valve 326 and causes this control valve to extend the piston of the bottom mold cylinder. Similarly, the output of the fifth AND gate, AND–5, is connected to the input P–12 of the top mold cylinder control valve 310 which opens the control valve 310 to cause the piston of the top mold cylinder 76 to extend. The output of gate AND–5 is also connected to the input of the cut-off control valve 314 and a binary "1" air pressure signal causes the cut-off mechanism to function.

The output of the limit switch LS1 is connected to the second input of the OR circuit OR–7 whose outputs are connected to the retract input P–32/42 of the pick-up control valve 330. This valve causes both the clip and weight pick-up cylinders to retract their cylinders.

The output of the first limit switch LS1 is also connected to one input of a two input AND gate, AND–7, and also through a time NOT circuit 38 whose output is connected through an automatic pumping control valve 22 and pressure indicator 26 to the input of the pump control valve 350. The pump control valve receives a supply of compressed air from a lubricator circuit 352 which is connected to the pump regulator 302. The output of the pump control valve 350 provides the P logic signal and is operated to actuate the lead pump with the manual control valve 354 which is located on the front panel being "ON" when the logic signal $S_2i$ is generated. This logic signal P, which also causes the pump injector to operate, is also coupled to provide an input to a first NOT circuit NOT–1. The second input to the NOT circuit is derived from the limit switch LS8. The output of the NOT–1 circuit representing a $P_{NOT}$ signal in the presence of a P signal, is coupled to one input of a two input second AND gate, AND–2. The remaining input to gate AND–2 is derived from the limit switch LS7, which also provides a second input to the gate AND–7, whose output is coupled to the clockwise control input P–22 of the sector cylinder control valve 322. The output of the AND–2 gate is coupled to the input of a second NOT circuit, NOT–2. The remaining input to the circuit NOT–2 is provided by the output of the limit switch LS10 which is also coupled to provide one input of a two input eighth AND gate, AND–8. The output of the gate AND–8 and the circuit NOT–2 are coupled through a two input OR circuit OR–1 to provide one input of a second OR circuit OR–2 and one input of a third OR circuit OR–3. The second input to the second OR circuit OR–2 is derived from the first AND gate AND–1 which receives two inputs, one from the limit switch LS6 and the second from the limit switch LS9. The output of AND–1 is also connected to provide the bottom mold cylinder open signal P–14 to the bottom mold cylinder control valve 326. The output of the second OR circuit OR–2 is coupled to provide the P–11 input to the top mold cylinder control valve which causes the top cylinder to open the mold half-way. The third OR circuit receives its second input from the fifth AND gate AND–5 and its output is coupled to the P–13 input of the bottom mold cylinder control valve 326 which functions to cause the piston of the bottom mold cylinder to extend thereby closing the mold half-way.

The second input to the eighth AND gate AND–8 is derived from the output of the third AND gate AND–3 whose two inputs are derived from the limit switch LS9 and the limit switch LS7. The output of the limit switch LS9 is also connected to one input of a fourth AND gate, AND–4,,the second input of which is derived from the limit switch LS6. The output of the fourth AND gate AND–4 is coupled to provide one input of the gate AND–5 as described. The limit switch LS2 has its output connected direly to the P–31/41 input of the pick-up control valve which causes the weight and pick-up cylinder pistons to extend. The output of the limit switch LS3 is coupled to the control input of the jet control valve 308 and also to the OR–7 gate as previously described and to one input of a sixth AND gate, AND–6, the remaining input of which is derived from the limit switch LS7. The output of the AND gate, AND–6, is coupled to an automatic cycle valve, which when open is represented by the logic signal $S_1$. The output of the automatic cycle valve is coupled to the P–21 input, or the counterclockwise input, of the sector cylinder control valve 322. When it is actuated, the sector cylinder actuates the sector cylinder piston to retract, thereby causing the sector to move in a counterclockwise direction. Having thus described the logic circuitry, which is noted, is all pneumatic logic, it may be useful to summarize the various control logic inputs. These are designated in the following table:

| CONTROL LOGIC INPUTS | |
|---|---|
| INPUT | FUNCTION (or Input) |
| LS1 | Mold closed |
| LS2 | Mold mid-position |
| LS3 | Mold open |
| LS6 | Pick-ups extended |
| LS7 | Pick-ups retracted |
| LS8 | Sector CW |
| LS9 | Sector CCW |
| LS10 | Mold ⅓ open to full open |
| LS11 | Sector CCW to ⅔ (30°) towards CW |
| CS | Clip in clip pick-up |
| P | Lead pump pressure on |
| $S_1$ | Automatic cycle valve on |
| $S_2$ | Lead pump valve on |
| $S_3$ | Cut-off valve on |

In operation the logic circuitry of this invention is such as to cause the machine to operate in an automatic fashion, sequence by sequence, insuring each time that a prior operation has been completed prior to initiating the subsequent sequence. Assuming that the molten metal to be cast is in a molten state, and the various lines are filled, the cycle is initiated by initially holding the mold handle down, that is with the mold full open, and the main air valve 20 is turned on. The clip magazine 92 is allowed to fill after the feeder switch 18 is turned on. Finally, the automatic cycle switch and pump switch 22 are turned on. The cycle initiates at this point (by the presence of logic signal $S_1$) since the automatic cycle valve is open. The presence of the signals or air pressures from the lines of the limit switches LS7, LS9, and LS10, indicating respectively that the pick-ups are retracted, that the sector is in a counterclockwise position and that the mold is one-third open to full open (this condition was preset manually prior to turning the cycle on) initiates the logic cycle. This logic cycle or sequence is summarized on the following table:

The cycle initiates at Step VI from the logic circuitry P–11 and P–13 output signals are passed to the respective mold cylinder control valves 324 and 326 causing the bottom mold cylinder to close, the mold half-way with the top mold cylinder remaining in position. As may be seen from the above note logic table, the existing logic output signals at this stage are LS2, LS7, LS9, LS10, $P_{NOT}$ and CS. The CS signal is present because initially no clip is in the clip pick-up and the $P_{NOT}$ signal occurs because there is no pump signal P since no lead is being pumped.

It may be seen now that in step VII the limit switch LS2 now signals that the mold is in the mid-position and that the pick-ups are extended. If both pick-up fingers have their respective clip and casting, the clip would be introduced into the half open position of the mold and the weight would be introduced into the cut-off position to have the sprue cut off. These pick-ups are extended by the presence of the logic signals P–31/41 which actuate the pick-up control valve 330 to extend the respective clip and pick-up pistons. In Step VIII the limit switches LS6, LS9, $C_S$ are sensed to generate P–12, P–13 signals which cause the mold to close fully and if the logic signal $S_3$ derived from the cut-off valve being open is present, the sprue will be cut-off by actuating the cut-off valve 314 to operate the anvil and hammer to slide against each other therby cutting off the sprue as described.

In Step IX limit switch LS1 triggers P–32/42 to cause the weight and clip pick-ups to retract. Referring again to the logic diagram, it is noted that this output from the LS1 limit switch also operates through the time NOT circuit 38 to initate after a time delay a pumping signal to the pump control valve 350 which causes the injection pump to insert molten metal into the mold to effect the molding and thereby establishing the P logic signal which actually, because of the time delay, does

| AUTOMATIC CYCLE SEQUENCE | | | | |
|---|---|---|---|---|
| STEP | DESCRIPTION | INPUTS (BEFORE) | OUTPUTS | INPUTS (AFTER) |
| I | Mold open to mid-position | LS1, (7), (8), ($10_{NOT}$) ($P_{NOT}$) | P–11, P–13 | LS2, 7, 8, 10 $P_{NOT}$ |
| II | Pick-ups extended grip new clip grip weight clip | LS(2)7, 8, 10, $P_{NOT}$ | P–31/41 | LS2, 6, 8, 10 $P_{NOT}$, CS |
| III | Mold open full | LS2, (6), (8) 10, $P_{NOT}$, CS | P–11 P–14 | LS3, 6, 8, 10, $P_{NOT}$, CS |
| IV | Pick-ups Retract | LS(3), 6, 8, 10, $P_{NOT}$, CS | P–32/42 | LS3, 7, 8, 10, $P_{NOT}$, CS |
| V | Sector Rotate CCW | LS(3), (7), 8, 10, $P_{NOT}$, CS | P–21 | LS3, 7, 9, 10, $P_{NOT}$, CS |
| VI * | Mold closed to mid-position | LS3, (7), (9), ($S_1$), (10), $P_{NOT}$, CS | P–11 P–13 | LS2, 7, 9, 10 $P_{NOT}$, CS |
| VII | Pick-ups extend Clip to mold Weight to cut-off | LS(2), 7, 9, 10, $P_{NOT}$, CS | P–31/41 | LS2, 6, 9, 10, $P_{NOT}$, CS |
| VIII | Mold Close full (and cut-off, if $S_3$ on) | LS2, (6), (9), 10, $P_{NOT}$, (CS) | P–12 P–13 | LS1, 6, 9, CS |
| IX | Pick-ups retract | LS(1), 6, 9, | P–32/42 | LS1, 7, 9 |
| X | Sector rotate CW Knock-off Weight | LS(1), (7) 9 | P–22 | LS1, 7, 8 |
| IX$_A$ | Pump on | LS(1) 7, 8, ($S_2$) | Pump | LS1, 7, 8, $P_{NOT}$ |

* End Point not take place for a short period of time. Referring again to the cycle sequence in Step X, limit switches LS1 and LS7 are sensed to generate a P-22 logic signal which causes the sector 110 to rotate in a clockwise direction until its limit stop prevents further movement such that the clip pick-up cylinder is in position to pick-up a new clip and the weight pick-up cylinder is in a position to remove the casting from the mold. Simultaneously, therewith, during the period of time that the sector is moving towards its clockwise point, limit switch LS10 together with the logic signal P-21 causes the weight knock-off cylinder 240 to operate thereby extending the knock-off bar so that it intersects or interdicts the swinging path of the casting thereby forcing any casting present from between the fingers of the weight pick-up and allowing it to drop into the chute 104. Next in Step IX$_A$ the limit switch LS1 still signalling the closed mold and the S$_2$ valve being open, the pump operates generating the P$_{NOT}$ signal previously described such that in the next cycle (logic Step I) the limit switches LS7, LS8 and P$_{NOT}$ are sensed to generate the P-11 and P-13 outputs which acting upon the respective mold cylinder control valves maintain the bottom mold cylinder closed but actuate the cop mold cylinder to open the mold to a mid-position. In Step II the limit switch LS2 is sensed to generate outputs P-31/41 which cause the pick-ups to extend as previously described. In this instance the pick-ups grip a new clip from the magazine and at the same time the weight pick-up grips the casting which is now in the half-way oeen mold.

In Step III limit switches LS6 and LS8 are sensed to generate the output signals P-11 and P-14 which acting on the mold cylinder control valves 324 and 326 to open the mold fully. With the mold open, the limit switch LS3 now initiates Step IV and generates the output signals P-32/42 which acting on the pick-up control valve 330 causes the clip and weight pick-up cylinders to retract their pick-ups thereby withdrawing a new clip from the magazine and withdrawing the casting from the mold. As the final step of the sequence, limit switches LS3 and LS7, sensing that the mold is open and that the pick-ups are not retracted, initiate the output signal P-21 to rotate the sector 110 in a counterclockwise direction such that a new clip is now positioned ready for insertion into the mold and the casting is now at the cut-off position such that when the next step, previously described, namely, Step VI, is initiated the mold is closed initially to the mid-position thereby to receive the new clip. In the following steps the pick-ups are extended, that is a new clip is introduced into the mold, and the weight is introduced into the cut-off anvil. Next the mold is closed and the sprue is cut-off by the cooperating action of the anvil and hammer.

There has thus been described an automatic machine in which a simple sector unit rotating between two fixed positions holds a pair of pick-ups that are angularly displaced such that the one pick-up has the function of continuously picking up a new clip and introducing the same into a mold. The weight pick-up on the other hand operates between the mold position and a cut-off position to transfer a composite casting from the mold over to a cut-off position at which the sprue is removed. The operation is sequential with each successive step occurring only after the completion of a preceding step. The machine is easily constructed, of low cost, and capable of rapid, economical, reliable operation.

It is obvious that many embodiments may be made of this inventive concept, and that many modifications may be made in the embodiments hereinbefore described. Therefore, it is to be understood that all descriptive matter herein is to be interpreted as illustrative, exemplary, and not in a limited sense.

What is claimed is:

1. In an apparatus effecting composite die castings having a mold with cooperating movable die members, actuating means for operating said members between open and closed mold positions, a container for molten metal communicating with said mold, pump means for transferring said molten metal into said mold to form said castings including a sprue, a supply magazine for continuously supplying clips to a delivery position, the combination comprising:

a severing means for separating the sprue from said die casting, and a pivotal transfer means including angularly spaced clip and weight pick-up means for sequentially transferring said clips from said supply magazine to said mold to form said composite casting and then transferring said composite casting from said mold to said severing means for removal of said sprue.

2. An apparatus according to claim 1 wherein said pick-up means are positioned contiguous to said supply magazine and said mold when in a first pivotal position and said mold and said severing means when in a second pivotal position.

3. An apparatus according to claim 2 wherein said pick-up means are mounted on separate clip and weight pick-up drive means which are respectively axially extendable for said clip pick-up to withdraw a clip from said magazine and to insert said clips into said mold, and said weight pick-up means to withdraw said casting from said mold and to introduce said casting to said severing means.

4. An apparatus according to claim 3 wherein said pick-up means are extended simultaneously.

5. An apparatus according to claim 3 which includes knock-off means for interdicting the arcuate path of one of said pick-up means to remove said castings therefrom.

6. An apparatus according to claim 3 wherein said severing means includes an anvil adapted to support said castings and a severing hammer adapted to sever said castings, thereby to separate the sprue therefrom.

7. An apparatus according to claim 6 wherein said anvil includes means positioned against said casting immediately prior to operation of said severing means.

8. An apparatus according to claim 1 where said severing means includes an anvil adapted to support said castings and a severing hammer adapted to sever said castings, thereby to separate the sprue therefrom.

9. An apparatus according to claim 8 wherein said anvil includes means to position said anvil against said casing immediately prior to operation of said severing hammer.

10. An apparatus according to claim 2 wherein said pick-up means each includes a pair of fingers adapted to grip said clips.

11. An apparatus according to claim 10 wherein said clip pick-up means has a first sensing means to detect the presence of a clip therein.

12. An apparatus according to claim 1 which also includes a means to sense the open and closed condition of said mold, and means responsive thereto to effect the transfer of said clips from said magazine to said mold.

13. An apparatus according to claim 3 which includes sensing means responsive to the mold being less than one-third open, no metal being pumped, said transfer means being in said first pivotal position, and said pick-up means being retracted for activating said actuating means to open said mold to a mid-position in which said clips may be inserted.

14. An apparatus according to claim 3 which includes sensing means responsive to the mold being in said mid-position to simultaneously extend said pick-up means to respectively grip a new clip from said magazine and the clip molded in the metal in said mold.

15. An apparatus according to claim 3 which includes sensing means responsive to said transfer means being in said first position, and to said pick-up means being extended for activating said actuating means to open said mold to a full open position so that said casting may be removed.

16. An apparatus according to claim 3 which includes sensing means responsive to said mold being opened full for actuating said drive means to simultaneously retract said pick-up means, thereby to simultaneously withdraw a clip previously gripped from said magazine and to withdraw a casting from said mold.

17. An apparatus according to claim 3 which includes sensing means responsive to said mold being in said full open position and to said pick-up means being retracted for operating said transfer means in a counterclockwise sense thereby to transfer said casting from said mold position to said severing position and a new clip from the magazine to the mold position.

18. An apparatus according to claim 3 which includes sensing means responsive to the mold being more than one-third open, to said pick-up means being retracted, to said transfer means being in said second position for activating said actuating means to close said mold to its mid-position.

19. An apparatus according to claim 3 which includes sensing means responsive to a mold being in a mid-position, to simultaneously extend said pick-up means to respectively transfer a new clip into said mold and to transfer said casting to said severing means.

20. An apparatus according to claim 3 which includes sensing means responsive to a clip being in said clip pick-up means, to said pick-up means being extended and to said transfer means being in said second position for activating said actuating means to close said mold and for actuating said severing means to remove the sprue from said casting.

21. An apparatus according to claim 3 which includes sensing means responsive to said mold being closed, for actuating said drive means to simultaneously retract said pick-up means thereby to withdraw said pick-up means from the clip in said mold and to withdraw said casting from said severing means.

22. An apparatus according to claim 3 which includes sensing means responsive to said mold being closed, to said pick-up means being retracted for moving said transfer means from said second position to said first position whereby one of said pick-up means is now in position to pick-up a new clip.

23. An apparatus according to claim 3 which includes sensing means responsive to said mold being closed, for pumping molten metal into said mold and for actuating a weight knock-off arm for interdicting the movement of said transfer means while moving in a clockwise sense thereby to remove said casting from said weight pick-up means.

* * * * *